(12) United States Patent
Chan

(10) Patent No.: US 8,013,932 B2
(45) Date of Patent: Sep. 6, 2011

(54) WATERPROOF ELECTRONIC RECORDING DEVICE

(76) Inventor: Raymond Chan, Hong Kong (CN)

(*) Notice: Subject to any disclaimer, the term of this patent is extended or adjusted under 35 U.S.C. 154(b) by 303 days.

(21) Appl. No.: 12/199,787

(22) Filed: Aug. 27, 2008

(65) Prior Publication Data

US 2010/0053421 A1 Mar. 4, 2010

(51) Int. Cl.
*H04N 5/225* (2006.01)
(52) U.S. Cl. .......................... 348/373; 348/81
(58) Field of Classification Search .................. 348/373, 348/81–83; 396/25–29; 429/97–100; 292/11, 292/163, 35; 297/14
See application file for complete search history.

(56) References Cited

U.S. PATENT DOCUMENTS

| | | | | |
|---|---|---|---|---|
| 6,136,467 A | * | 10/2000 | Phelps et al. | 429/97 |
| 7,502,550 B2 | * | 3/2009 | Ariga | 396/27 |
| 7,758,996 B2 | * | 7/2010 | Mackle et al. | 429/97 |
| 2002/0067425 A1 | * | 6/2002 | Iverson | 348/373 |
| 2003/0003949 A1 | * | 1/2003 | Park | 455/550 |
| 2004/0076415 A1 | * | 4/2004 | Da Silva | 396/25 |
| 2004/0189011 A1 | * | 9/2004 | Ahn et al. | 292/1 |
| 2004/0192106 A1 | * | 9/2004 | Britz | 439/577 |
| 2010/0060747 A1 | * | 3/2010 | Woodman | 348/222.1 |

OTHER PUBLICATIONS

User Manual for Oregon Scientific camera model ATC-5K, Date: Aug. 18, 2008.*
User Manual for Oregon Scientific camera model ATC-2K, Date: 2006.*
Release Date User Manual ATC-5K, Date: Aug. 18, 2008.*

* cited by examiner

*Primary Examiner* — Nelson D. Hernández Hernández
(74) *Attorney, Agent, or Firm* — Eagle IP Limited; Jacqueline C. Lui

(57) ABSTRACT

A waterproof electronic recording device with a display panel is disclosed. In an embodiment, a housing of the electronic recording device is cylindrical in shape with an electronic display module having a display panel disposed at a back end of the housing. A latch encloses the electronic display module and the display panel is disposed substantially perpendicular to the longitudinal axis of the housing in a waterproof configuration. In another embodiment, the latch is hingedly connected to the housing, and a lock is provided to connect the latch to the housing in a waterproof configuration.

10 Claims, 3 Drawing Sheets

WATERPROOF ELECTRONIC RECORDING DEVICE

FIELD OF INVENTION

This invention relates to an electronic recording device, in particular a waterproof electronic recording device with a display panel.

BACKGROUND OF INVENTION

Recent trend of electronic recording device are moving toward travel-friendly versions that are rugged and waterproof, such that travelers can take and use their recording devices to all areas and under all conditions of travel.

SUMMARY OF INVENTION

In the light of the foregoing background, it is an object of the present invention to provide an alternate electronic recording device.

Accordingly, the present invention, in one aspect, is an electronic recording device that is compact, mountable, reliable and waterproof. In an exemplary embodiment of the present invention, the recording device contains a cylindrical front, with an electronic display module comprising a display panel disposed at the back end of the cylinder. A still image and video recording module having a lens is installed at the front end of the cylinder. An audio recording module comprising a microphone encased in the body of the device to capture sound data simultaneously with the video data. The display panel is enclosed by a latch, and the latch is connected to the housing of the recording device, which the housing is waterproof. The display panel is disposed substantially perpendicular to the longitudinal axis of the cylinder in a waterproof configuration, such that the electronic recording device is waterproof.

In one implementation, the electronic recording device further comprises a lock that connects the latch to the housing in a waterproof configuration. In one embodiment, the lock comprises two locking mechanisms. At least three forces in different directions are required in order to unlock the lock.

In another exemplary embodiment, the latch is hingedly connected to the housing.

The electronic recording device according to this invention allows a display panel to be made independent of the longitudinal cross-sectional shape of the recording device. By enclosing the electronic display module with a latch and connecting it to the housing in a waterproof configuration allows the electronic recording device to be waterproof even though the latch can be opened. The lock in this invention prevents unintentional unlocking by requiring three different forces simultaneously to unlock the lock.

BRIEF DESCRIPTION OF FIGURES

FIG. 1b is a back perspective view of the electronic recording device in FIG. 1a.

DETAILED DESCRIPTION OF THE PREFERRED EMBODIMENTS

As used herein and in the claims, "comprising" means including the following elements but not excluding others.

As used herein and in the claims, "couple" refers to electrical coupling or connection either directly or indirectly via one or more electrical means unless otherwise stated.

Figure 1A:
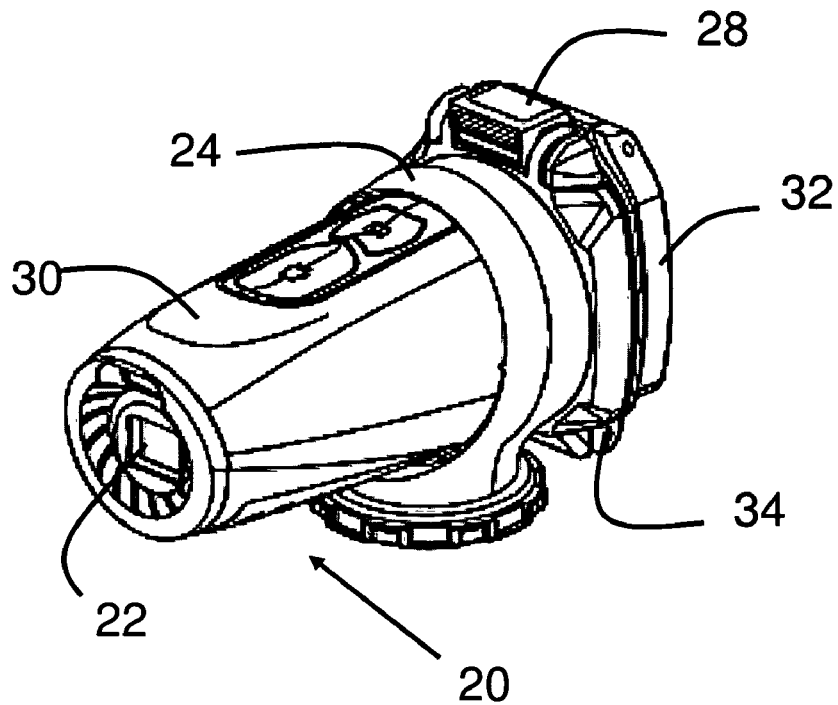
FIG. 1a is a front perspective view of an electronic recording device according to an exemplary embodiment.
Figure 1B:
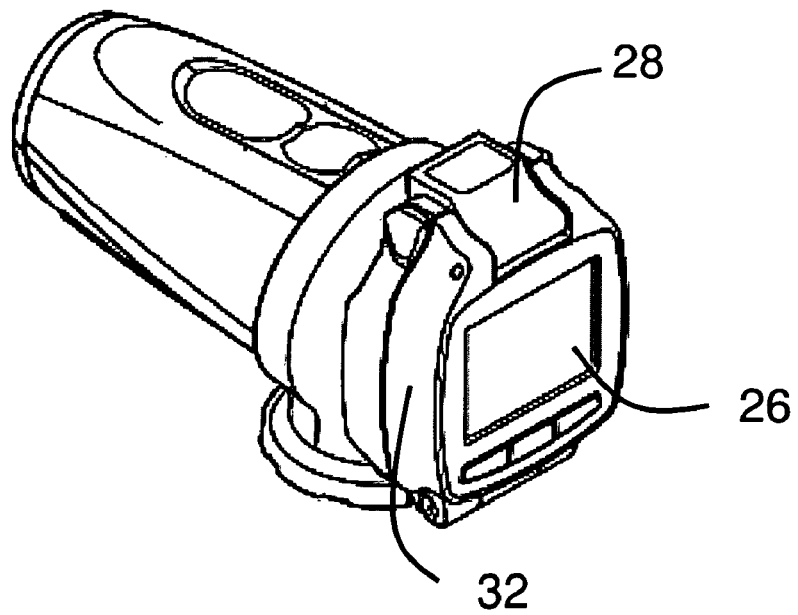

Referring now to FIGS. 1a and 1b, the first embodiment of the present invention is a recording device 20 with a video recording module (of which includes a lens 22, an image sensor and a microprocessor, but only the lens 22 is shown in FIGS. 1a and 1b) housed inside a waterproof housing 30. An audio recording module (not shown) having a microphone is also installed inside the recording device 20. An electronic display module having a display panel 26, and a lock 28, are also provided inside the housing 30. The housing 30 is substantially in a shape of a cylinder having a front end and a back end, with the lens 22 disposed at the front end of the cylinder. A latch 32 is connected to the housing 30 through a hinge 34 and the electronic display module is enclosed by the latch 32. The display panel 26 is disposed substantially perpendicular to the longitudinal axis of the cylinder when the latch 32 is locked to the housing 30. A mounting member 24 having a ring is provided, and the recording device 20 is securely attached to the ring.

The lock 28 locks the latch 32 to the housing 30 in a waterproof manner, such that water is not able to enter the recording device 20 at the seams. The lens 22 is also surrounded by rubber rings to prevent water entry. Furthermore, the housing 30 is made using double injection of polycarbonate and rubber, giving the recording device 20 a hard outside surface and a more elastic inside surface with no seam in between the two layers. This method of manufacturing gives the recording device 20 shock-absorbing ability as well as waterproofing ability. In one embodiment, the recording device 20 is waterproof at a depth of 5 meters or less.

The mounting member 24 is adapted to mate with an external device. The bottom of the mounting member 24 is made to attach to the corresponding portion of the external device by snapping, screwing or other methods. By securing the external device to an object at defined location, for example a bike handle or a skateboard, the recording device 20 can be tightly installed at that defined location. In a specific embodiment, the recording device 20 is cylindrical such that the orientation of the recording device 20 can be changed with respect to the mounting member 24 according to the user's preference.

For a recording device, one of the main concerns is the size of the display panel 26. In one embodiment, the display panel 26 functions as a viewfinder that shows the live video or image that is being recorded, so it is desirable that the size of the display panel 26 to be as large as possible to make the image easier for the user to see. In a cylindrical recording device, it is difficult to fit a large flat display panel onto the curved plane of the cylinder. In this invention, the electronic display module is enclosed in the latch 32 of the recording device 20. The latch 32 is disposed at the back end of the cylinder, which is a flat surface. Therefore, the display panel 26 can be made larger in this case, or in general, be made independent of the size of the cylinder. In a specific embodiment, the display panel 26 is a 1.5 inch thin film transistor (TFT) liquid crystal display (LCD) color display panel and the size of the recording device 20 is less than 120 mm×60 mm×80 mm.

Figure 2A:
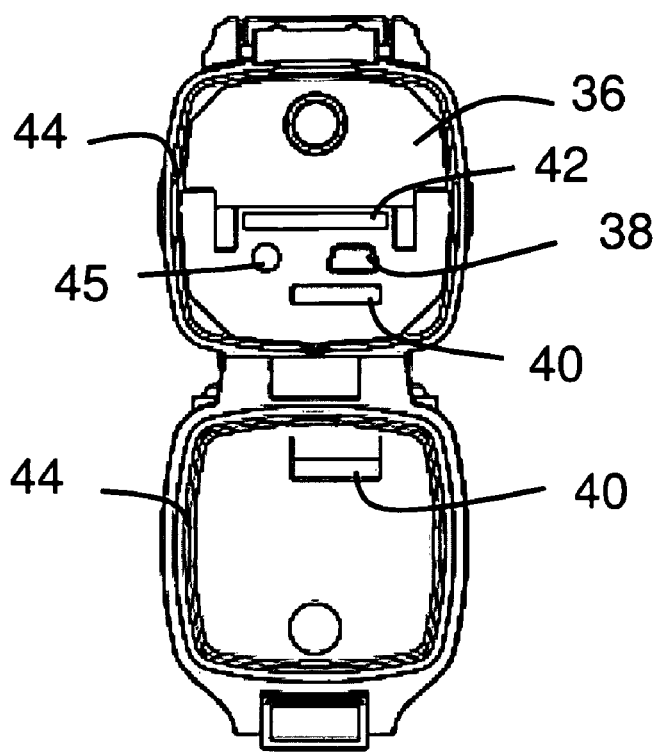
FIG. 2a is a back elevation view of the electronic recording device in FIG. 1a with the latch in an open position.
Figure 2B:
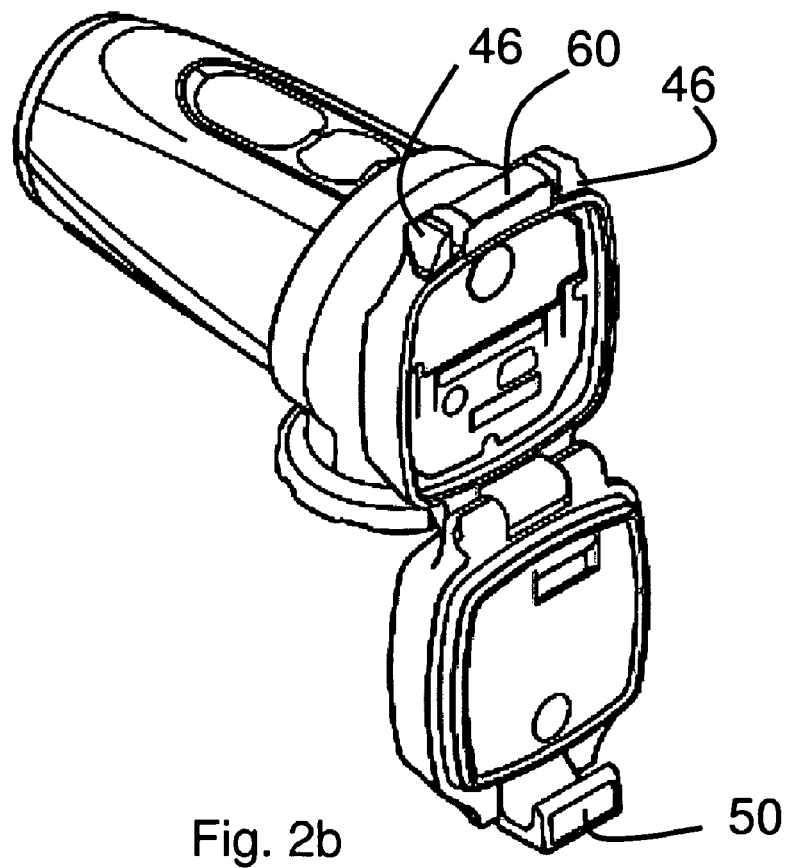
FIG. 2b is a side perspective view of the electronic recording device in FIG. 1a with the latch in an open position.

Referring now to FIGS. 2a and 2b, an exemplary embodiment with the latch 32 opened is illustrated. When the latch 32 is opened, the back end of the cylinder is exposed. The back end of the cylinder comprises a battery insert covered by a battery cover 36, a Universal Serial Bus (USB) port 38 and a memory card slot 42. It also has an audio and visual connector 45. A cable opening 40 is provided at both the back end of the cylinder and the latch 32, and a flexible flat cable (FFC) (not shown) is inserted through the cable opening 40, connecting the electronic display module to the recording module. This flat cable is protected by a layer of hard, flexible plastic polypropylene covering. In a specific embodiment, the polypropylene layer is about 2 mm thick. Rubber rings 44 are also disposed at the edge of both the cylinder and the latch 32, and are aligned so that the rubber rings 44 press against each other when the latch 32 is closed.

The battery cover 36 can be flipped open for batteries to be inserted inside the waterproof housing 30. The battery cover 36 can then be screwed to an enclosed battery case (not shown) to secure its position. The memory card slot 42 is adapted for insertion of a memory card to save recorded data. The USB port 38 is used to transmit data to an external device such as a personal computer through appropriate cables. The rubber rings 44 are made of sealing rubber to prevent water from entering the recording device 20 when the latch 32 is closed.

Figure 3:
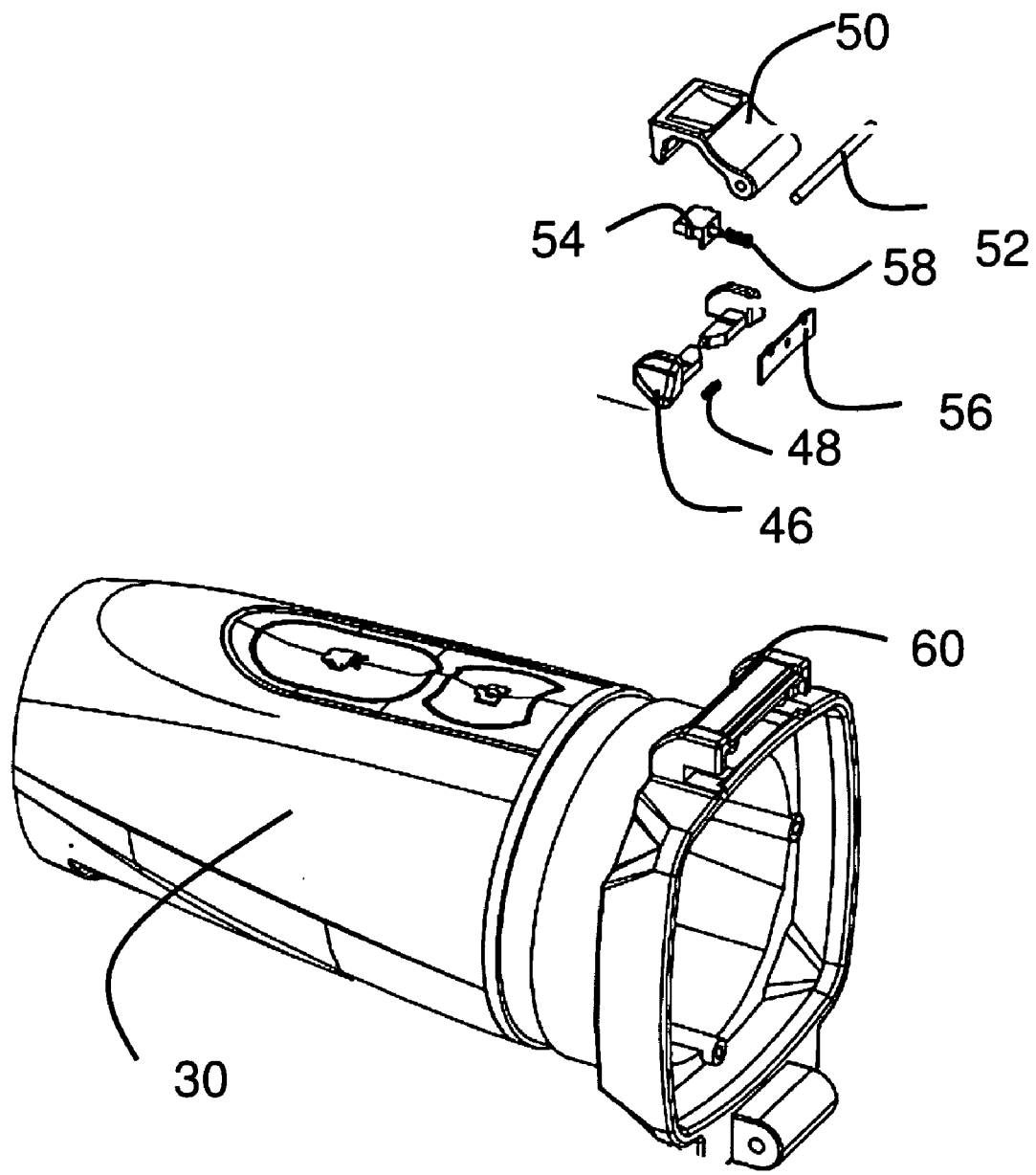
FIG. 3 is an exploded assembly diagram of the lock according to an exemplary embodiment.

FIGS. 2a, 2b and 3 showed a lock 28 according to an exemplary embodiment. The lock 28 comprises two safety buttons 46 disposed at two sides of a clip holder 60. A first compression spring 48 is inserted between the two safety buttons 46. A latch clip 50 is attached to a clip hinge 52, with the two ends of the clip hinge 52 connected to the latch 32. A center member 54 is attached to a clip holder back plate 56 through a second compression spring 58. The center member is inserted into the clip holder 60, and an opening is made at the clip holder 60 so that the tip of the center member 54 is exposed.

To lock the latch 32 to the housing 30, first the latch 32 must be moved to a position where the display panel 26 is substantially perpendicular to the longitudinal axis of the recording device 20. Then, the latch clip 50 is pushed onto the clip holder 60. A groove is made at the inside of the hook part of the latch clip 50, and the exposed tip of the center member 54 is extended into the groove. At a locked position, the rubber rings 44 are compressed against each other tight enough that water is not able to enter the device through the seam. The latch clip 50 is designed to be only able to lock to the clip holder 60 when the user pushes the latch clip 50 downwards with a sufficient force to compress the rubber rings 44 to a water-tight condition.

To unlock the latch 32 from the housing 30, first the two safety buttons 46 need to be depressed by pushing the two buttons together towards each other. The inward movement of the diagonal part of the two safety buttons 46 will then push the center member 54 backwards, releasing the tip of the center member 54 from the latch clip 50. The latch clip 50 can then be pulled upwards to release from the housing 30.

This lock 28 prevents unintentional unlocking of the latch 32 from bumps and other physical forces by including two locking mechanisms in the lock 28. The first locking mechanism, comprising of the latch clip 50 and the clip holder 60, requires upward force to unlock. The second locking mechanism, comprising of the two safety buttons 46, the center member 54, and the compression springs, together with the latch clip 50, requires two forces pushing against each other in order to unlock. That means three forces in different directions are needed simultaneously in order to fully unlock the latch 32 from the housing 30. Normally, a bump will only push the lock 28 one way, and it is almost impossible that three bumps will push the lock simultaneously in an unintentional situation, so this lock 28 is very effective in preventing unintentional unlocking.

In an alternative configuration, the housing 30 is provided without door or latch 32 and the display panel is fixedly encased within the housing so that it cannot swing open for user access to the interior once manufacturing is complete. As the depth of water increases, the seams are always the first place that water enters the recording device 20. Therefore, if there are no door seams in the device, the waterproofing ability is greatly increased.

In this configuration, the battery cover 36 is eliminated since the housing 30 is now in one piece. As such, batteries cannot be inserted into the recording device 20. In one embodiment, a rechargeable power source such as lithium batteries is encased in the recording device 20. The power source is permanently fixed within and not removable from the recording device 20. The power source can be charged by indirect charging mechanisms such as magnetic or induction charging such that a power cable is not needed to be connected to the device in order to charge the power source.

In one embodiment, the recorded video and audio information are transmitted via wireless communication for example infra-red or Wi-Fi using a wireless transceiver in the recording device 20. A memory device such as memory card is integrated inside the recording device 20. Cable connectors to external devices in this case can be eliminated completely.

In yet another embodiment, connectors such as the USB port 38 or audio and visual connector 45 are present at the surface of the housing 30. They can be designed so that the recording device 20 can still operate under water. For example, the connectors can be covered up by a removable rubber plug so that the connectors are waterproof in operation and can be exposed if needed.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the display panel 26 can be any kind of display panel that is known to anyone skilled in the art, and is not limited to TFT LCD. The size of the display panel does not need to be 1.5 inch, however a size of at least 1 inch is preferred such that the user can view the displayed information with more comfort. Also, the shape of the recording device 20 may also be oblong without the cross section being substantially circular, which means that the recording device is substantially cylindrical.

The latch 32 can be connected to the housing 30 by methods other than a hinge, such as snap, clip or other known methods.

In one embodiment, the recording device 20 also comprises a wireless receiver, such as an infra-red receiver. The user can use an external remote device to control the recording device 20 through wireless communication means such as infra-red. Recorded video clips or images can also be transmitted to other devices with a wireless transmitter installed or through wired transmission such as USB.

What is claimed is:

1. An electronic recording device comprising:
   a) a video recording module comprising a lens;
   b) an audio recording module comprising a microphone;
   c) an electronic display module comprising a display panel;
   d) a waterproof housing enclosing said audio and video recording module;

wherein said housing is oblong with a front end and a back end; said lens is installed at said front end of said housing; a latch is connected to said back end of said housing, said latch further enclosing said electronic display module with the plane of said display panel disposed substantially perpendicular to the longitudinal axis of said housing when said display panel is attached to said housing in a waterproof configuration; said electronic recording device further comprising a lock adapted to securely connect said latch onto said housing in a waterproof configuration; wherein said latch is hingedly connected to said back end of said housing; said lock comprises two locking mechanisms, wherein at least three forces are required simultaneously to unlock said lock.

2. The electronic recording device according to claim 1, wherein said lock comprises two safety buttons and a latch clip; wherein a user needs to push said two safety buttons towards each other and pull said latch clip upwards simultaneously to unlock said lock.

3. The electronic recording device according to claim 1, wherein said display panel has a diagonal length of at least 1 inch.

4. The electronic recording device according to claim 1, wherein the entire perimeter of said electronic display module is fixedly secured onto the back end of the housing via said latch.

5. The electronic recording device according to claim 1, further comprising a wireless receiver adapted to receive a control signal from a remote source through wireless communication.

6. The electronic recording device according to claim 1, further comprising a wireless transmitter for transmitting information that is recorded by said video recording module and audio recording module to a remote external device.

7. The electronic recording device according to claim 1, wherein said housing is substantially cylindrical.

8. The electronic recording device according to claim 1, wherein said electronic display module is electrically connected to said video recording module through a length of flexible flat cable.

9. An electronic recording device comprising:
a) a video recording module comprising a lens;
b) an audio recording module comprising a microphone;
c) an electronic display module comprising a display panel;
d) a waterproof housing enclosing said audio and video recording module;
wherein said housing is oblong with a front end and a back end; said lens is installed at said front end of said housing; a latch is connected to said back end of said housing, said latch further enclosing said electronic display module with the plane of said display panel disposed substantially perpendicular to the longitudinal axis of said housing when said display panel is attached to said housing in a waterproof configuration; said electronic recording device further comprising a lock adapted to securely connect said latch onto said housing in a waterproof configuration; wherein said latch is hingedly connected to said back end of said housing; said lock having a first locking mechanism and a second locking mechanism, the first mechanism comprising latch clip on said latch, said latch clip adapted to lock to a clip holder of said housing; and wherein said first locking mechanism and said second locking mechanism require forces in different directions for unlocking.

10. The electronic recording device according to claim 9, wherein said second locking mechanism comprises two safety buttons adapted to be pushed towards each other.

* * * * *